US010680429B2

(12) United States Patent
Kim

(10) Patent No.: US 10,680,429 B2
(45) Date of Patent: Jun. 9, 2020

(54) BATTERY PROTECTION CIRCUIT AND BATTERY PACK INCLUDING SAME

(71) Applicant: SAMSUNG SDI CO., LTD., Yongin-si, Gyeonggi-do (KR)

(72) Inventor: Dukjung Kim, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 462 days.

(21) Appl. No.: 15/687,334

(22) Filed: Aug. 25, 2017

(65) Prior Publication Data

US 2018/0069388 A1 Mar. 8, 2018

(30) Foreign Application Priority Data

Sep. 7, 2016 (KR) .................... 10-2016-0115125

(51) Int. Cl.
*H02H 3/05* (2006.01)
*H02H 3/08* (2006.01)
(Continued)

(52) U.S. Cl.
CPC .............. *H02H 3/05* (2013.01); *H01M 2/348* (2013.01); *H01M 10/425* (2013.01);
(Continued)

(58) Field of Classification Search
CPC .......... H02H 3/05; H02H 5/048; H02H 3/085; H02H 7/18; H02H 3/08; H01M 10/48;
(Continued)

(56) References Cited

U.S. PATENT DOCUMENTS 7,538,519 B2 * 5/2009 Daou .................... H02J 7/0031
320/116
8,513,953 B2 * 8/2013 Myoen .................. H02H 9/001
324/538
(Continued)

FOREIGN PATENT DOCUMENTS

JP 2014-023236 A 2/2014
KR 10-2004-0052845 A 6/2004
KR 10-1223938 B1 1/2013

OTHER PUBLICATIONS

Xiao Ming, Asada Tetsuro; Title: Charge monitoring device; Date: Mar. 2, 2014; Abstract, specification and Drawings. (Year: 2014).*

*Primary Examiner* — Dharti H Patel
(74) *Attorney, Agent, or Firm* — Lewis Roca Rothgerber Christie LLP

(57) ABSTRACT

A battery protective circuit including a resistor connected to a switch between a battery and a load through which a first current flows, a first driver to supply the first current to the switch and the resistor, a negative temperature coefficient element having resistance that varies in response to heat of the resistor, a second driver to supply a second current to the negative temperature coefficient element, a short-circuit device to be mechanically deformed by a current, a mechanical switch including a plurality of terminals connected with the battery, the terminals electrically connected with each other by deformation of the short-circuit device, a fuse connected in series between the battery and the mechanical switch, a circuit-changing switch configured to supply the second current to the short-circuit device or to block supply thereof, and a controller to control operations of the first driver, the second driver, and the circuit-changing switch.

15 Claims, 3 Drawing Sheets

(51) Int. Cl.
- *H02H 5/04* (2006.01)
- *H01M 2/34* (2006.01)
- *H01M 10/42* (2006.01)
- *H01M 10/48* (2006.01)
- *H02H 7/18* (2006.01)

(52) U.S. Cl.
CPC .............. *H01M 10/48* (2013.01); *H02H 3/08* (2013.01); *H02H 3/085* (2013.01); *H02H 5/048* (2013.01); *H02H 7/18* (2013.01); *H01M 2010/4271* (2013.01); *H01M 2200/103* (2013.01); *H01M 2200/105* (2013.01); *H01M 2220/20* (2013.01)

(58) Field of Classification Search
CPC .............. H01M 10/425; H01M 2/348; H01M 2220/20; H01M 2200/105; H01M 2200/103; H01M 2010/4271; B60Y 2400/3084; B60L 2240/547; B60L 58/21; B60L 58/19; H02J 7/0063; H02J 7/0031; G01R 31/327
USPC ........................................................ 361/93.1
See application file for complete search history.

(56) References Cited

U.S. PATENT DOCUMENTS

| | | | |
|---|---|---|---|
| 8,687,338 B2* | 4/2014 | Odaohhara | H02J 7/0031 320/134 |
| 2011/0049977 A1* | 3/2011 | Onnerud | B60L 3/0046 307/9.1 |
| 2011/0273137 A1* | 11/2011 | Nakatsuji | H01M 2/34 320/107 |
| 2016/0059712 A1* | 3/2016 | Jang | B60L 50/50 307/10.1 |

* cited by examiner

BATTERY PROTECTION CIRCUIT AND BATTERY PACK INCLUDING SAME

CROSS-REFERENCE TO RELATED APPLICATION

This application claims priority to, and the benefit of, Korean Patent Application No. 10-2016-0115125 filed in the Korean Intellectual Property Office on Sep. 7, 2016, the entire contents of which are incorporated herein by reference.

BACKGROUND

1. Field

Embodiments relate to a battery protective circuit and a battery pack including the same.

2. Description of the Related Art

In accordance with recent environmental regulations, such as $CO_2$ regulations, there has been a growing interest in environmentally-friendly vehicles. Thus, car companies have been actively promoting research and product development for pure electric vehicles or hydrogen vehicles, as well as hybrid vehicles or plug-in hybrid vehicles.

A high-voltage battery for storing electrical energy obtained from various energy sources is used in environmentally-friendly vehicles. A high-voltage electric field system for a vehicle uses high-voltage electrical energy supplied from a high-voltage battery to generate driving energy or electric field energy for a vehicle.

A vehicle equipped with the high-voltage battery can use a high-voltage switch, such as a contactor, to open the connection between the high-voltage battery and the vehicle's high-voltage electrical system in some situations to manage high voltage stability.

The high-voltage switch may be welded (or may be fused) and permanently damaged by the use of currents that exceed a permissible range of batteries or of high-voltage wires, increased resistance due to deterioration of high-voltage wires, repeated use, abnormal performance degradation of components, and the like. Welding of the high-voltage switch makes it impossible to open the high-voltage switch, and may damage the high-voltage circuit and the high-voltage electric field system in the vehicle.

Accordingly, when it is impossible to control the opening of the high-voltage switch due to the welding of the high-voltage switch, a method for forcibly opening high-voltage wires may be suitable.

The above information is only for enhancement of understanding of the background of the invention, and therefore may contain information that does not form the prior art.

SUMMARY

Embodiments provide a battery protective circuit and a battery pack including the same in which it is possible to detect whether a high-voltage switch is welded, and to forcibly open a large current path between a battery and a load when the high-voltage switch is welded.

An embodiment of the present invention provides a battery protective circuit including a resistor electrically connected to a high-voltage switch for forming a high-current path between a battery and a load to form a path through which a first current flows, a first driver configured to supply the first current to the high-voltage switch and the resistor, a negative temperature coefficient element configured to have resistance that varies in response to heat generation of the resistor, a second driver configured to supply a second current to the negative temperature coefficient element, a short-circuit device that is configured to be mechanically deformed by a current, a mechanical switch including a plurality of terminals connected with a positive electrode and a negative electrode of the battery, the terminals being configured to be electrically connected with each other by deformation of the short-circuit device, a fuse connected in series between the battery and a first terminal of the mechanical switch, a circuit-changing switch configured to supply the second current to the short-circuit device or to block supply of the second current, and a controller configured to control operations of the first driver, the second driver, and the circuit-changing switch.

The controller may be configured to control the first driver such that the first current is supplied to the high-voltage switch when a control signal for inducing opening of the high-voltage switch is applied thereto.

The controller may be configured to control the first driver such that the first current is supplied to the high-voltage switch in a state in which the battery and the load are not electrically connected with each other.

The battery protective circuit may further include a current sensor connected in series with the high-voltage switch to measure the first current, wherein the controller is configure to operate the second driver depending on a current measurement result of the current sensor.

When the first current detected through the current sensor is equal to or greater than a threshold value, the controller may be configured to control the second driver such that the second current is supplied to the negative temperature coefficient element.

The battery protective circuit may further include a current sensor configured to measure the second current, wherein the circuit-changing switch includes a first terminal connected with the negative temperature coefficient element, a second terminal connected with the current sensor, and a third terminal connected with the short-circuit device, and wherein the first terminal is electrically connected to the second terminal or the third terminal depending on control of the controller.

The controller may be configured to control the circuit-changing switch such that the first terminal and the third terminal are electrically connected with each other when a magnitude of the second current detected through the current sensor while the first terminal and the second terminal of the circuit-changing switch are electrically connected with each other is equal to or greater than a threshold value.

The first current and the second current may be supplied by a power supply that is different from the battery.

An embodiment of the present invention provides a battery pack including a battery, a high-voltage switch configured to form a high-current path between the battery and a load, a failure-detecting circuit including a resistor that is connected with the high-voltage switch to form a path through which a first current flows, and a first driver configured to supply the first current to the high-voltage switch, a negative temperature coefficient element configured to have resistance that varies in response to heat generation of the resistor, a second driver configured to supply a second current to the negative temperature coefficient element, a short-circuit device that is configured to be mechanically deformed by a current, a mechanical switch including a plurality of terminals connected with a positive electrode and a negative electrode of the battery, the terminals configured to be electrically connected with each other by deformation of the short-circuit device, a fuse connected in series between the battery and a first terminal of the mechanical switch, a circuit-changing switch configured to supply the second current to the short-circuit device, or to block the supply thereof, and a controller configured to control operations of the high-voltage switch, the first driver, the second driver, and the circuit-changing switch.

The controller may be configured to output a control signal for inducing opening of the high-voltage switch thereto when the battery and the load are not electrically connected with each other, and may be configured to control the first driver such that the first current is supplied to the high-voltage switch.

The failure-detecting circuit may include a current sensor connected in series with the high-voltage switch to measure the first current, and the controller may be configured to control the second driver such that the second current is supplied to the negative temperature coefficient element when the first current detected through the current sensor is equal to or greater than a threshold value.

The battery pack may further include a current sensor configured to measure the second current, wherein the circuit-changing switch includes a first terminal connected with the negative temperature coefficient element, a second terminal connected with the current sensor, and a third terminal connected with the short-circuit device, and wherein the first terminal is electrically connected to the second terminal or the third terminal depending on control of the controller.

The controller may be configured to control the circuit-changing switch such that the first terminal and the third terminal are electrically connected with each other when a magnitude of the second current detected through the current sensor when the first terminal and the second terminal of the circuit-changing switch are electrically connected with each other is equal to or greater than a threshold value.

The battery pack may further include at least one switch configured to control a connection between the high-voltage switch and the failure-detecting circuit.

The first current and the second current may be supplied by an external power supply.

According to the described embodiments, the battery pack can detect whether a high-voltage switch is welded, and can forcibly open a high-current path between a battery and a load when the high-voltage switch is welded, thereby acquiring high voltage safety.

DETAILED DESCRIPTION

Figure 1:
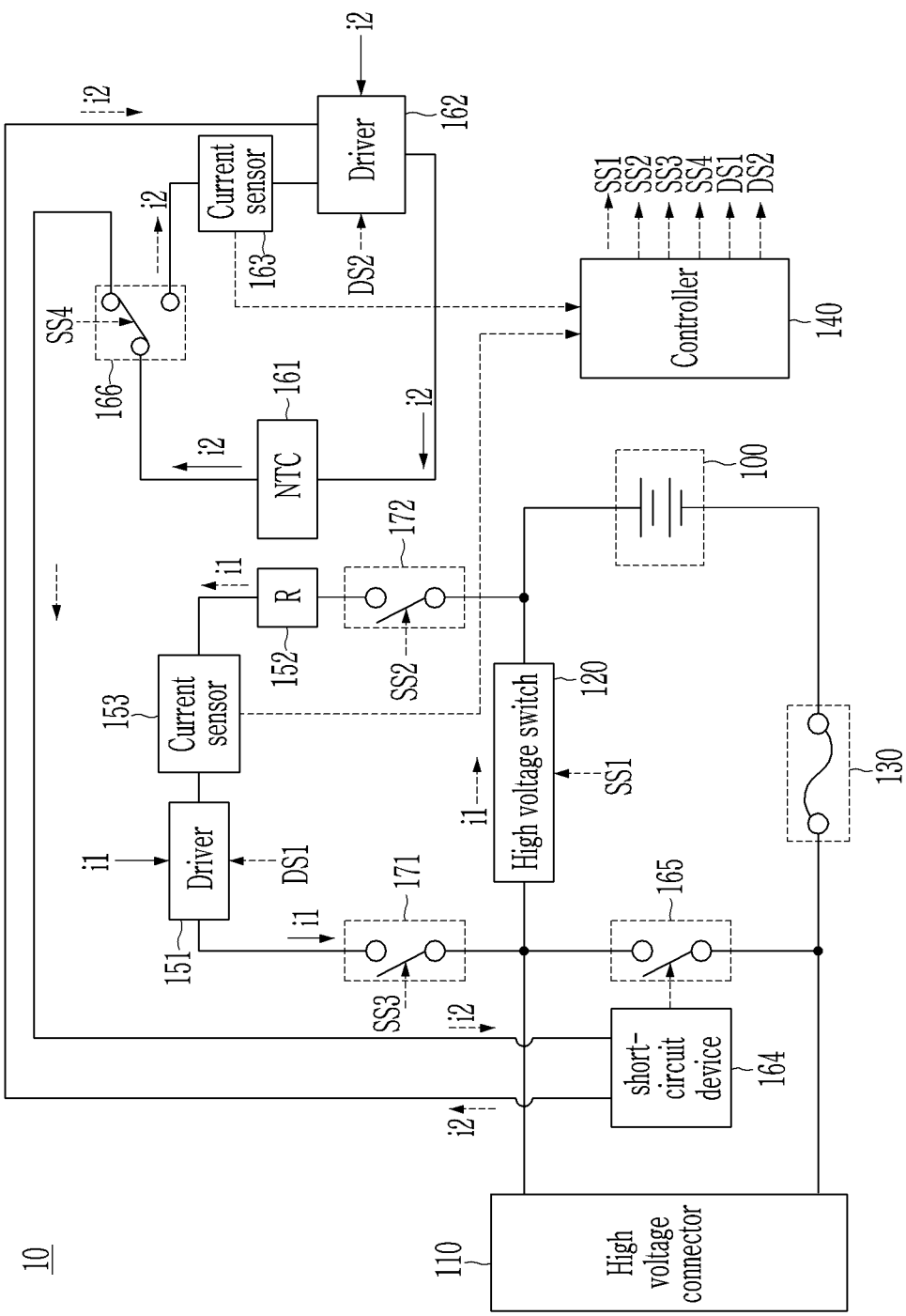
FIG. 1 schematically illustrates a battery pack according to an embodiment.

Features of the inventive concept and methods of accomplishing the same may be understood more readily by reference to the following detailed description of embodiments and the accompanying drawings. Hereinafter, embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

In the following description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element, layer, region, or component is referred to as being "on," "connected to," or "coupled to" another element, layer, region, or component, it can be directly on, connected to, or coupled to the other element, layer, region, or component, or one or more intervening elements, layers, regions, or components may be present. However, "directly connected/directly coupled" refers to one component directly connecting or coupling another component without an intermediate component. In addition, it will also be understood that when an element or layer is referred to as being "between" two elements or layers, it can be the only element or layer between the two elements or layers, or one or more intervening elements or layers may also be present.

For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

In the following examples, the x-axis, the y-axis and the z-axis are not limited to three axes of a rectangular coordinate system, and may be interpreted in a broader sense. For example, the x-axis, the y-axis, and the z-axis may be perpendicular to one another, or may represent different directions that are not perpendicular to one another.

The terminology used herein is for the purpose of describing particular embodiments only and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

When a certain embodiment may be implemented differently, a specific process order may be performed differently from the described order. For example, two consecutively described processes may be performed substantially at the same time or performed in an order opposite to the described order.

Also, any numerical range disclosed and/or recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112(a) and 35 U.S.C. § 132(a).

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Thus, embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Hereinafter, an embodiment of a battery protective circuit and a battery pack including the same will be described with reference to the drawings.

FIG. 1 schematically illustrates a battery pack according to an embodiment.

Referring to FIG. 1, the battery pack 10 according to the present embodiment includes a battery 100, a high-voltage connector 110, a high-voltage switch 120, a circuit breaker 130, a controller 140, and a battery protective circuit.

The battery 100 may be a high-voltage battery in which a plurality of cells are connected in parallel or in series.

The high-voltage connector 110 is connected between the battery 100 and a load to transfer power supplied from the battery 100 to the load.

The high-voltage switch 120 is electrically connected between the battery 100 and the high-voltage connector 110 to form a high-current path between the battery 100 and the high-voltage connector 110. The high-voltage switch 120 may be electrically connected to high-voltage wires, and may control a high-current flow in which a high current flows by allowing the high-voltage wires to conduct electricity or by opening the connection with the high-voltage wires. In the present disclosure, the high-voltage wires serve as wires that are connected between the battery 100 and the load to form high-current paths in which high currents outputted from the battery 100 flow.

The high-voltage switch 120 may include a contactor. The contactor is a switch that may be opened and closed by an electromagnet, and the contact is closed or opened depending on the flow of a current flowing in the electromagnet. Specifically, when an operation power is supplied to the electromagnet, the contact is closed to turn on the contactor. When the operation power supplied to the electromagnet is blocked, the contact is opened to turn off the contactor.

The high-voltage switch 120 may be controlled to be opened and closed by supplying the operating power or by blocking the supply thereof depending on a control signal SS1, which may be applied from the controller 140.

The circuit breaker 130 may be electrically connected between the battery 100 and the high-voltage connector 110 to enable forcibly opening the high-current path. The circuit breaker 130 may include a fuse. The fuse is an element that is cut to open a circuit when an excessive current flows therein.

In FIG. 1, an example in which the high-voltage switch 120 and the circuit breaker 130 are respectively connected with a positive electrode and a negative electrode is illustrated, but the present invention is not limited thereto. The electrodes of the battery 100 that are respectively connected with the high-voltage switch 120 and the circuit breaker 130 may be modified. For example, the high-voltage switch 120 and the circuit breaker 130 may be respectively connected with the negative electrode and the positive electrode of the battery 100.

The battery protective circuit may include a failure-detecting circuit and an open circuit. The failure-detecting circuit is a circuit for detecting the failure of the high-voltage switch 120 by supplying a welding detection current i1 to the high-voltage switch 120.

The welding detection current i1 may be supplied by another power source (e.g., an external power source), which may be insulated from the battery 100. For example, the welding detection current i1 may be supplied by a constant power source of a vehicle system in which the battery pack 10 is mounted. In addition, for example, the welding detection current i1 may be supplied by a separate battery pack mounted in the vehicle system.

The failure-detecting circuit is connected in series with the high-voltage switch 120 to form a current path through which the welding detection current i1 flows. As a result, the failure-detecting circuit may be configured to be connected in series with the high-voltage switch 120 between a positive electrode and a negative electrode of an external power supply for supplying the welding detection current i1.

The failure-detecting circuit may include a driver 151, a current sensor 153, and a resistor 152 connected in series with the high-voltage switch 120 between the positive electrode and the negative electrode of the external power supply for supplying the welding detection current i1.

The driver 151 serves to control the flow of the welding detection current i1. The driver 151 may control the connection between the high-voltage switch 120 and the external power supply for supplying the welding detection current i1 to thereby supply the welding detection current i1 to the high-voltage switch 120 or block the supply thereof. An operation of the driver 151 may be controlled depending on a control signal DS1 of the controller 140.

The current sensor 153 and the resistor 152 serve to detect the welding detection current i1 flowing in the high-voltage switch 120. The current sensor 153 detects the welding detection current i1 flowing in the high-voltage switch 120 to output the detection result to the controller 140.

The resistor 152 may generate heat by being heated by the welding detection current i1 flowing in the high-voltage switch 120.

The open circuit of the battery protective circuit serves to convert thermal energy generated by the welding of the high-voltage switch 120 into a current, and to open a high-current path by using the current. The open circuit may include a negative temperature coefficient (NTC) element 161, a driver 162, a current sensor 163, a short-circuit device 164, a mechanical switch 165, and a circuit-changing switch 166.

The NTC element 161, which serves as a resistor element having resistance that is changed depending on a temperature, may have resistance that is changed depending on a temperature of the resistor 152 included in the failure-detecting circuit. The NTC element 161 is disposed adjacent to the resistor 152, and may receive heat or thermal energy from the resistor 152. Because the resistance of the NTC element 161 decreases as a temperature thereof increases, the resistance of the resistor 152 decreases as the temperature thereof increases.

The driver 162 serves to control the supply of a temperature measurement current i2 to the open circuit. The temperature measurement current i2 may be supplied by another power source (e.g., an external power supply) that is insulated from the battery 100. For example, the temperature measurement current i2 may be supplied by a constant power source of the vehicle system in which the battery pack 10 is mounted. In addition, for example, the temperature measurement current i2 may be supplied by a separate battery pack mounted in the vehicle system.

The driver 162 may control the connection between the external power supply and the NTC element 161, and may supply the temperature measurement current i2 supplied from the external power supply to the NTC element 161 or may block the supply of the temperature measurement current i2. An operation of the driver 162 may be controlled depending on a control signal DS2 of the controller 140.

The temperature measurement current i2 flowing through the NTC element 161 may vary in size depending on the resistance of the NTC element 161 when an output voltage of the external power supply for supplying the temperature measurement current i2 is constantly maintained.

Because the resistance of the NTC element 161 varies depending on temperature, a magnitude of the temperature measurement current i2 flowing through the NTC element 161 may be changed depending on the temperature of the NTC element 161. Resultantly, the temperature measurement current i2 flowing through the NTC element 161 can be varied in response to a temperature of the resistor 152, which operates as a heat source of the NTC element 161.

The current sensor 163 is used to detect the magnitude of the temperature measurement current i2. The current sensor 163 detects the temperature measurement current i2 flowing through the NTC element 161, and outputs the detection result to the controller 140.

The short-circuit device 164 may be made of a metal material, such as a bimetal, a shape memory alloy, or the like, that generates mechanical deformation by heat. When a current is applied to the short-circuit device 164, the short circuit device 164 may be heated and deformed by the heat generated by the current flow. The short-circuit device 164 may be operated as an actuator of the mechanical switch 165, or may be operated as a means for operating the actuator of the mechanical switch 165.

The mechanical switch 165 may be used to forcibly short-circuit the high-voltage wires connected with different electrodes of the battery 100. The mechanical switch 165 may include a first terminal connected to the high-voltage wire connected to a positive electrode of the battery 100 and a second terminal connected to the high-voltage wire connected to a negative electrode of the battery 100, and may serve to forcibly short-circuit the high-voltage wires by allowing the two terminals to conduct electricity therebetween.

A circuit breaker 130 may be connected between the battery 100 and one of the terminals of the mechanical switch 165. For example, the circuit breaker 130 may be connected between the negative electrode of the battery 100 and one of the terminals of the mechanical switch 165. Accordingly, when the high-voltage wires are forcibly short-circuited by the mechanical switch 165, a current outputted from the battery 100 may flow to the circuit breaker 130 by the mechanical switch 165 so that the high-current path may be forcibly blocked by the circuit breaker 130.

The circuit-changing switch 166 serves to control the flow of the temperature measurement current i2. The circuit-changing switch 166 may be a three-way switch including a first terminal connected to the NTC element 161, a second terminal connected to the current sensor 163, and a third terminal connected to the short-circuit device 164. The circuit-changing switch 166 may control the flow of the temperature measurement current i2 passing through the NTC element 161 by electrically connecting the NTC element 161 with one of the current sensor 163 and the short-circuit device 164.

When the electrical connection between the NTC element 161 and the current sensor 163 is made by the circuit-changing switch 166, the NTC element 161 and the current sensor 163 may be connected in series with each other between the positive electrode and the negative electrode of the external power supply for supplying the temperature measurement current i2, thereby forming a current path of the temperature measurement current i2. In this case, a magnitude of the temperature measurement current i2 may be detected by the current sensor 163, and the detection result may be transferred to the controller 140.

When the electrical connection between the NTC element 161 and the short-circuit device 164 is made by the circuit-changing switch 166, the NTC element 161 and the short-circuit device 164 may be connected in series between the positive electrode and the negative electrode of the external power supply for supplying the temperature measurement current i2 to form a current path of the temperature measurement current i2. In this case, the temperature measurement current i2 may be used to operate the mechanical switch 165 by generating thermal deformation of the short-circuit device 164.

Switching of the circuit-changing switch 166 may be controlled by a control signal SS4 applied from the controller 140. The circuit-changing switch 166 may be operated in an initial state to make the electrical connection between the NTC element 161 and the current sensor 163.

The battery pack 10 may include switches 171 and 172 for making the electrical connection between the failure-detecting circuit and the high-voltage switch 120, or for blocking the electrical connection therebetween. The battery pack 10 may include a switch 171 connected between the driver 151 and the high-voltage switch 120 (e.g., a first terminal of the high-voltage switch 120), and may include a switch 172 connected between the resistor 152 and the high-voltage switch 120 (e.g., a second terminal of the high-voltage switch 120).

The switches 171 and 172 may prevent an output current of the battery 100 from leaking to the failure-detecting circuit by making the electrical connection between the failure-detecting circuit and the high-voltage switch 120 only while detecting a failure of the high-voltage switch 120. The switches 171 and 172 may be turned on or off by control signals SS3 and SS2 applied from the controller 140, which may control a general operation of the battery pack 10. The operation of the controller 140 will be described in detail with reference to FIG. 2 and FIG. 3.

In the battery pack 10 of the above-described structure, the controller 140 may be implemented by a processor implemented as one or more central processing units (CPUs) or other chipsets, microprocessors, and the like.

Figure 2:
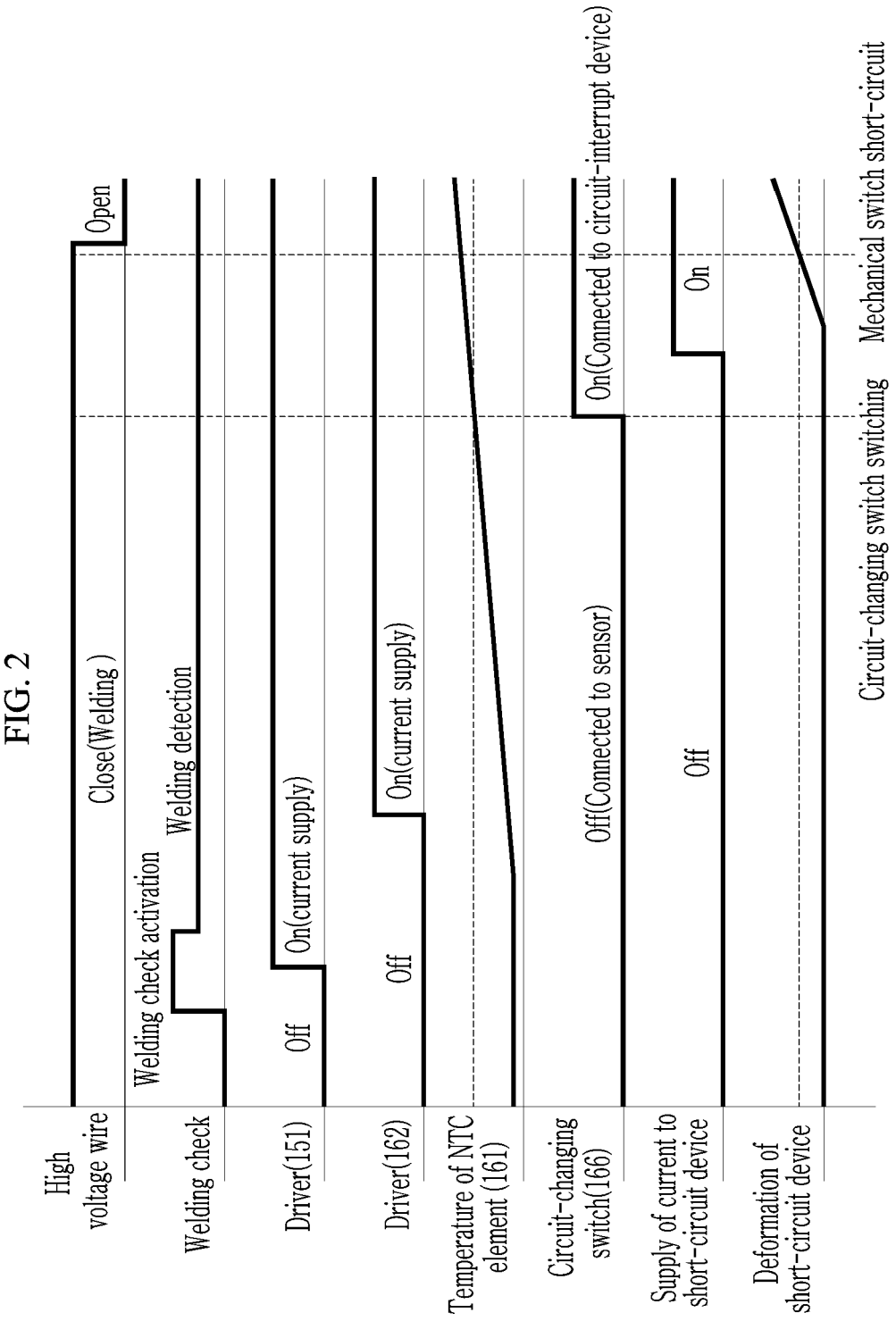
FIG. 2 schematically illustrates an operation timing chart of a battery protective circuit according to an embodiment.
Figure 3:
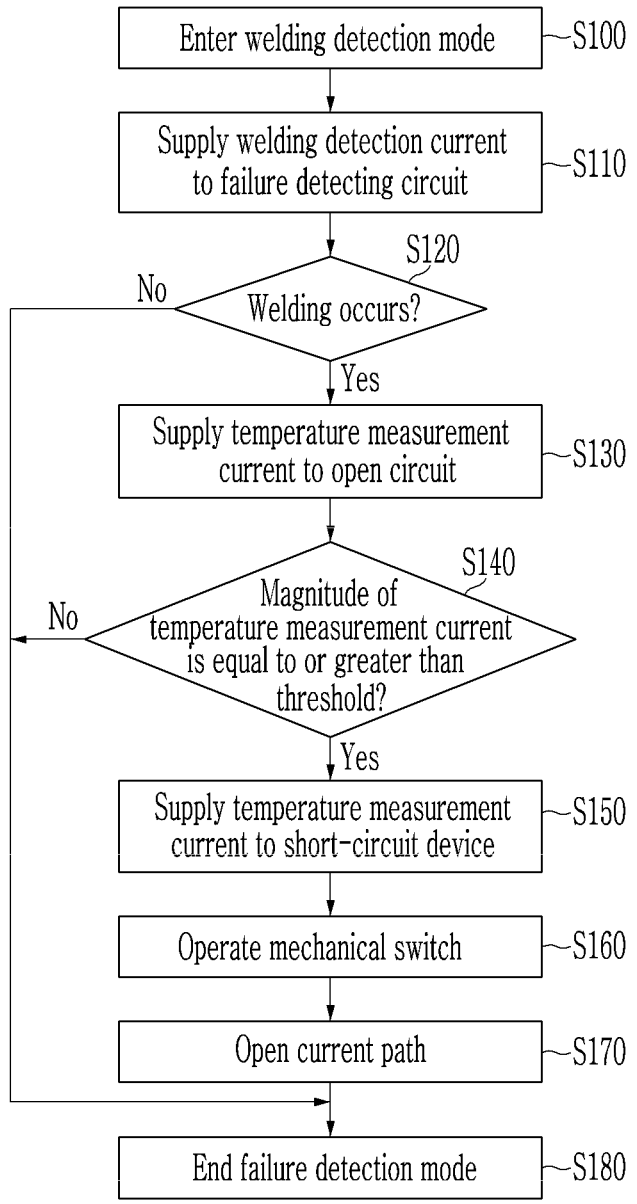
FIG. 3 illustrates a battery protecting method for a battery pack according to an embodiment.

FIG. 2 schematically illustrates an operation timing chart of a battery protective circuit according to an embodiment, and FIG. 3 illustrates a battery protecting method for a battery pack according to an embodiment.

Referring to FIG. 2 and FIG. 3, when entering a failure-detection mode (S100), the controller 140 of the battery pack 10 according to the present embodiment supplies the welding detection current i1 to the failure-detecting circuit (S110).

In S100, the controller 140 may enter the failure-detection mode in both a first state in which the electrical connection between the high-voltage connector 110 and the load is not made, and a second state in which a control signal SS1 for inducing the opening of high-voltage switch 120 is outputted to the high-voltage switch 120.

No current flows through the high-current path extended from the battery 100 to the load in a state in which the high-voltage connector 110 and the load are not electrically connected with each other (e.g., when the battery 100 and the load are not electrically connected with each other). Accordingly, it is possible to prevent the load from being affected by the welding detection current i1 flowing to the load in the operation of the failure-detection mode.

In S110, the controller 140 may supply the welding detection current i1 to the failure-detecting circuit including the high-voltage switch 120 by controlling the driver 151. In this case, the switches 171 and 172 for controlling the connection between the high-voltage switch 120 and the failure-detecting circuit may be controlled to be turned on to electrically connect the high-voltage switch 120 and the failure-detecting circuit.

The controller 140 determines whether the high-voltage switch 120 is welded based on the detection result of the current sensor 153 as the welding detection current i1 is supplied to the failure-detecting circuit (S120).

When the welding detection current i1 is supplied to the high-voltage switch 120, the welding detection current i1 flows in the high-voltage switch 120 depending on whether the high-voltage switch 120 is welded. When the high-voltage switch 120 is welded, the welding detection current i1 outputted from the positive electrode of the external power supply may pass through the high-voltage switch 120 to form a current flow toward the negative electrode of the external power supply. The current sensor 153 is in a path of the current flow to detect the current flowing in the high-voltage switch 120.

In S120, the controller 140 detects whether the welding detection current i1 that is equal to or greater than a value (e.g., a predetermined value, or threshold value) flows through the high-voltage switch 120 through the current sensor 153, and may thereby determine whether the high-voltage switch 120 is welded depending on the detection result. When the welding detection current i1 that is equal to or greater than the value is detected through the current sensor 153, the controller 140 may determine that the high-voltage switch 120 is welded. In contrast, when no current flowing through the high-voltage switch 120 is detected through the current sensor 153, the controller 140 may determine that the high-voltage switch 120 is in a normal state.

When it is determined that the high-voltage switch 120 is in the normal state, the controller 140 ends the failure-detection mode (S180), and normally operates the high-voltage switch 120 (S180). Herein, when the failure-detection mode is ended, the controller 140 may block the supply of the welding detection current i1 by controlling the driver 151, and may separate/disconnect the failure-detecting circuit from the high-voltage switch 120 by controlling the switches 171 and 172.

When it is determined that the high-voltage switch 120 is welded in S120, the controller 140 supplies the temperature measurement current i2 to an open circuit (S130).

In S130, the controller 140 may supply the temperature measurement current i2 to the open circuit by controlling the driver 162. In addition, the controller 140 may control the circuit-changing switch 166 to electrically connect the NTC element 161 with the current sensor 163.

The controller 140 measures the temperature measurement current i2 that varies depending on the temperature of the NTC element 161 through the current sensor 163, and compares a magnitude of the temperature measurement current i2 with a threshold value (S140).

In S140, the controller 140 controls the circuit-changing switch 166 to supply the temperature measurement current to the short-circuit device 164 when the temperature measurement current i2 becomes equal to or greater than the threshold value within a given time (S150). As a result, the controller 140 controls the circuit-changing switch 166 to electrically connect the NTC element 161 with the short-circuit device 164.

When the temperature measurement current i2 is supplied to the short-circuit device 164, a thermal deformation of the short-circuit device 164 causes the mechanical switch 165 to operate, thereby short-circuiting the high-voltage wire (S160).

Accordingly, the output current of the battery 100 is transferred to the circuit breaker 130, and the circuit breaker 130 is cut off to forcibly open the current path of the high-voltage wire (S170).

As the high-voltage wire is forcibly opened, the failure-detection mode is ended (S180).

Meanwhile, in S140, when the magnitude of the temperature measurement current i2 is maintained to be smaller than a threshold value, the controller 140 may determine that there is a problem in the conjunction of the high-voltage switch 120, to output a conjunction error flag to an external controller.

According to the aforementioned embodiment, it is possible to provide a battery protective circuit that is capable of detecting a situation in which it is difficult to open the high-current path due to welding of the high-voltage switch 120, and that is capable of forcibly opening the high-current path when the high-voltage switch 120 is welded.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims. Therefore, those skilled in the art will understand that various modifications and other equivalent embodiments of the present invention are possible. Consequently, the true technical protective scope of the present invention must be determined based on the technical spirit of the appended claims and their functional equivalents.

DESCRIPTION OF SOME OF THE REFERENCE CHARACTERS

| | | | |
|---|---|---|---|
| 10: | battery pack | 100: | battery |
| 110: | high-voltage connector | 120: | high-voltage switch |
| 130: | circuit breaker | 140: | controller |
| 151, 162: | driver | 153, 163: | current sensor |
| 152: | resistor | 161: | NTC element |
| 164: | short-circuit device | 165: | mechanical switch |
| 166: | circuit-changing switch | 171, 172: | switch |

What is claimed is:

1. A battery protective circuit comprising:
    a resistor electrically connected to a high-voltage switch for forming a high-current path between a battery and a load to form a path through which a first current flows;
    a first driver configured to supply the first current to the high-voltage switch and the resistor;
    a negative temperature coefficient element configured to have resistance that varies in response to heat generation of the resistor;
    a second driver configured to supply a second current to the negative temperature coefficient element;
    a short-circuit device that is configured to be mechanically deformed by a current;
    a mechanical switch comprising a plurality of terminals connected with a positive electrode and a negative electrode of the battery, the terminals being configured to be electrically connected with each other by deformation of the short-circuit device;
    a fuse connected in series between the battery and a first terminal of the mechanical switch;
    a circuit-changing switch configured to supply the second current to the short-circuit device or to block supply of the second current; and
    a controller configured to control operations of the first driver, the second driver, and the circuit-changing switch.

2. The battery protective circuit of claim 1, wherein the controller is configured to control the first driver such that the first current is supplied to the high-voltage switch when a control signal for inducing opening of the high-voltage switch is applied thereto.

3. The battery protective circuit of claim 2, wherein the controller is configured to control the first driver such that the first current is supplied to the high-voltage switch in a state in which the battery and the load are not electrically connected with each other.

4. The battery protective circuit of claim 1, further comprising a current sensor connected in series with the high-voltage switch to measure the first current,
wherein the controller is configure to operate the second driver depending on a current measurement result of the current sensor.

5. The battery protective circuit of claim 4, wherein, when the first current detected through the current sensor is equal to or greater than a threshold value, the controller is configured to control the second driver such that the second current is supplied to the negative temperature coefficient element.

6. The battery protective circuit of claim 1, further comprising a current sensor configured to measure the second current,
wherein the circuit-changing switch comprises a first terminal connected with the negative temperature coefficient element, a second terminal connected with the current sensor, and a third terminal connected with the short-circuit device, and
wherein the first terminal is electrically connected to the second terminal or the third terminal depending on control of the controller.

7. The battery protective circuit of claim 6, wherein the controller is configured to control the circuit-changing switch such that the first terminal and the third terminal are electrically connected with each other when a magnitude of the second current detected through the current sensor while the first terminal and the second terminal of the circuit-changing switch are electrically connected with each other is equal to or greater than a threshold value.

8. The battery protective circuit of claim 1, wherein the first current and the second current are supplied by a power supply that is different from the battery.

9. A battery pack comprising:
a battery;
a high-voltage switch configured to form a high-current path between the battery and a load;
a failure-detecting circuit comprising a resistor that is connected with the high-voltage switch to form a path through which a first current flows, and a first driver configured to supply the first current to the high-voltage switch;
a negative temperature coefficient element configured to have resistance that varies in response to heat generation of the resistor;
a second driver configured to supply a second current to the negative temperature coefficient element;
a short-circuit device that is configured to be mechanically deformed by a current;
a mechanical switch comprising a plurality of terminals connected with a positive electrode and a negative electrode of the battery, the terminals configured to be electrically connected with each other by deformation of the short-circuit device;
a fuse connected in series between the battery and a first terminal of the mechanical switch;
a circuit-changing switch configured to supply the second current to the short-circuit device, or to block the supply thereof; and
a controller configured to control operations of the high-voltage switch, the first driver, the second driver, and the circuit-changing switch.

10. The battery pack of claim 9, wherein the controller is configured to output a control signal for inducing opening of the high-voltage switch thereto when the battery and the load are not electrically connected with each other, and is configured to control the first driver such that the first current is supplied to the high-voltage switch.

11. The battery pack of claim 9, wherein the failure-detecting circuit comprises a current sensor connected in series with the high-voltage switch to measure the first current, and
wherein the controller is configured to control the second driver such that the second current is supplied to the negative temperature coefficient element when the first current detected through the current sensor is equal to or greater than a threshold value.

12. The battery pack of claim 9, further comprising a current sensor configured to measure the second current,
wherein the circuit-changing switch comprises a first terminal connected with the negative temperature coefficient element, a second terminal connected with the current sensor, and a third terminal connected with the short-circuit device, and
wherein the first terminal is electrically connected to the second terminal or the third terminal depending on control of the controller.

13. The battery pack of claim 12, wherein the controller is configured to control the circuit-changing switch such that the first terminal and the third terminal are electrically connected with each other when a magnitude of the second current detected through the current sensor when the first terminal and the second terminal of the circuit-changing switch are electrically connected with each other is equal to or greater than a threshold value.

14. The battery pack of claim 9, further comprising at least one switch configured to control a connection between the high-voltage switch and the failure-detecting circuit.

15. The battery pack of claim 9, wherein the first current and the second current are supplied by an external power supply.

* * * * *